(12) United States Patent
Ohata

(10) Patent No.: US 8,099,370 B2
(45) Date of Patent: Jan. 17, 2012

(54) SYSTEM FOR FINANCIAL DOCUMENTATION CONVERSION

(75) Inventor: Michael T. Ohata, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

(21) Appl. No.: 11/695,664

(22) Filed: Apr. 3, 2007

(65) Prior Publication Data

US 2008/0250157 A1 Oct. 9, 2008

(51) Int. Cl.
*G06Q 20/00* (2006.01)

(52) U.S. Cl. .......... 705/76; 707/600; 707/601; 707/602; 707/604; 715/234; 715/237

(58) Field of Classification Search ................ 705/76
See application file for complete search history.

(56) References Cited

U.S. PATENT DOCUMENTS

| | | | |
|---|---|---|---|
| 6,542,912 B2 | 4/2003 | Meltzer et al. ............. 707/501.1 |
| 6,757,739 B1 | 6/2004 | Tomm et al. ................. 709/236 |
| 6,996,589 B1 | 2/2006 | Jayaram et al. ............... 707/204 |
| 7,415,482 B2* | 8/2008 | Blake et al. ......................... 1/1 |
| 7,590,647 B2* | 9/2009 | Srinivasan et al. .................... 1/1 |
| 2003/0037038 A1* | 2/2003 | Block et al. ......................... 707/1 |
| 2003/0041077 A1* | 2/2003 | Davis et al. ...................... 707/500 |
| 2003/0204461 A1 | 10/2003 | Magary et al. .................. 705/36 |
| 2003/0233354 A1 | 12/2003 | White et al. ....................... 707/3 |
| 2004/0193520 A1* | 9/2004 | LaComb et al. ................. 705/35 |
| 2005/0021427 A1* | 1/2005 | Takahashi et al. .............. 705/30 |
| 2005/0102212 A1* | 5/2005 | Roy ............................... 705/36 |
| 2005/0144096 A1 | 6/2005 | Caramanna, II et al. ....... 705/30 |
| 2005/0182777 A1* | 8/2005 | Block et al. .................... 707/100 |
| 2005/0183002 A1* | 8/2005 | Chapus .......................... 715/505 |
| 2006/0085738 A1* | 4/2006 | Chapus et al. ................. 715/513 |
| 2006/0230025 A1 | 10/2006 | Baelen .............................. 707/3 |
| 2007/0022093 A1 | 1/2007 | Wyatt et al. ....................... 707/2 |
| 2007/0050702 A1* | 3/2007 | Chopin et al. ................ 715/507 |
| 2007/0078877 A1* | 4/2007 | Ungar et al. ................... 707/101 |

FOREIGN PATENT DOCUMENTS

| | | | |
|---|---|---|---|
| WO | WO 2004/107195 A1 | 12/2004 |
| WO | WO 2006/117615 A2 | 11/2006 |

OTHER PUBLICATIONS

"UBMatrix Announces First XBRL-enabled Enterprise Information Integration and Reporting Solution," Apr. 19, 2005, Business Wire, pp. 1-4.*
Nash, T.G., "XML-Based Policy Configuration for Security-Enhanced Linux", The University of Tulsa, The Graduate School, 2005, http://personal.utulsa.edu, 43 pages.
Srinivas, S., "Road Map to XBRL Adoption as New Reporting Model", Information Systems Control Journal, 2004, 1, http://www.isaca.org, 2 pages.
"New "Language" Improves Financial Reporting via the Internet", Media Release Communiqué, http://www.icaa.ab.ca, 2 pages.

* cited by examiner

*Primary Examiner* — Evens J Augustin
*Assistant Examiner* — Alexis Casey
(74) *Attorney, Agent, or Firm* — Woodcock Washburn LLP

(57) ABSTRACT

A method to prepare an Extensible Business Reporting Language (XBRL) document in a web-hosted server includes authenticating a user, uploading financial information from a spreadsheet, storing the information, and processing the data into an XBRL compliant document for transmittal to a financial regulatory agency. The process takes an input from an Excel™ spreadsheet and produces a financial statement in XBRL format while providing a full audit trail for the document conversion and authorization including manual inputs to the final-form submission.

20 Claims, 3 Drawing Sheets

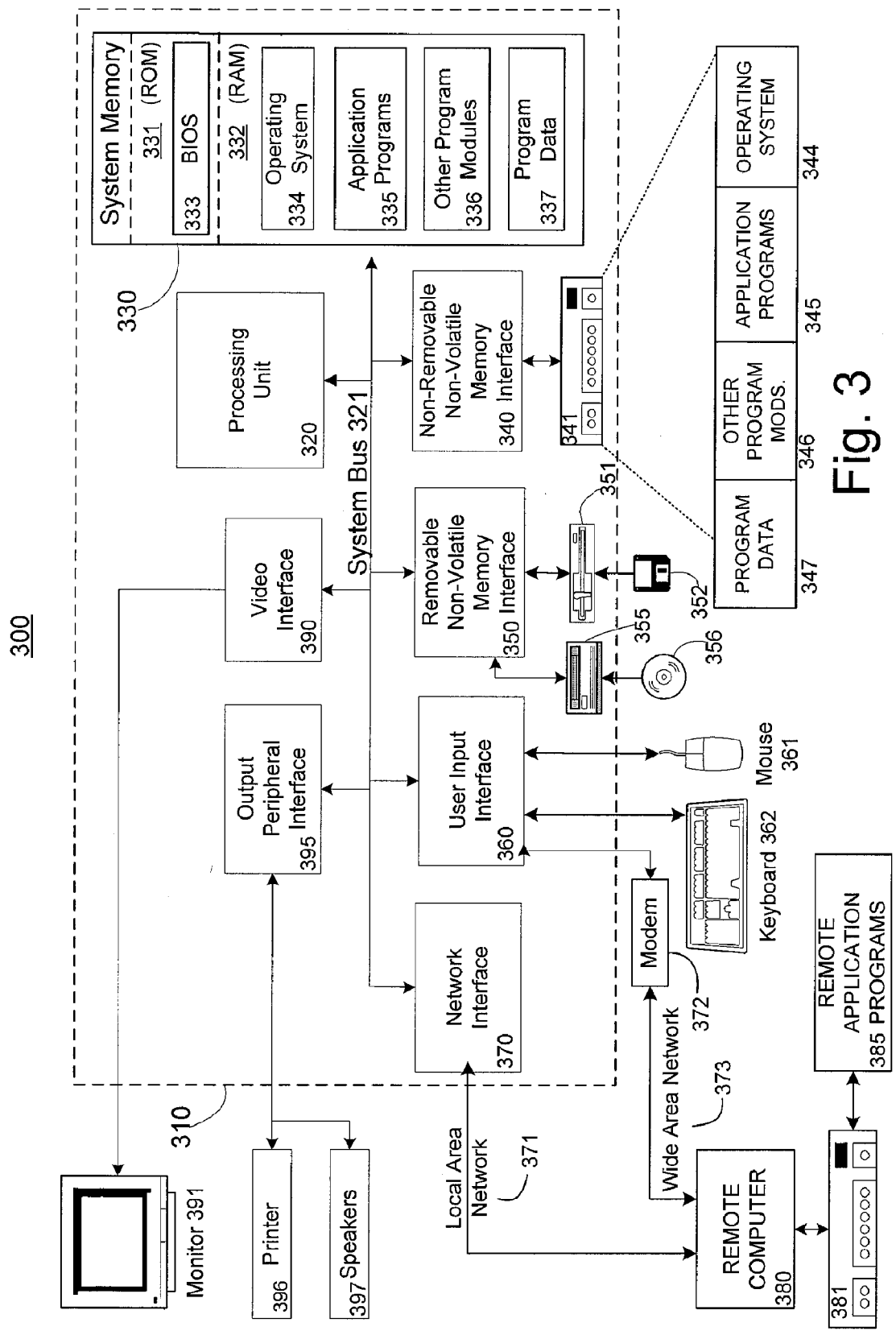

SYSTEM FOR FINANCIAL DOCUMENTATION CONVERSION

BACKGROUND

In today's regulatory environment, companies of all sizes in all industries face ever-increasing compliance requirements. Compliance activities regularly require reporting financial information to commercial banks, insurance issuers, tax authorities, stock exchanges, and other regulatory agencies. Most of this reporting takes place on paper with information manually entered on a form, submitted, and then keyed-in again by the receiving bank, agency and so forth. Regulators and stock exchanges have begun mandating filing in XML-based schemas to reduce manual data entry and errors and facilitate automation. For example, the U.K. tax authority, Her Majesty's Revenue and Customs, has mandated all companies file in an XML-based schema for finance and business reporting called Extensible Business Reporting Language (XBRL) by 2010. The U.S. Securities and Exchange Commission has implemented a voluntary filing program in XBRL and invested in the upgrading of their filing system to support XML data and specifically XBRL.

Few tools today can convert financial information to XBRL. There are also few tools that can automatically convert financial information to other required proprietary XML schemas. Finance and accounting software applications and other client-based tools that can convert financial information to XBRL require users to manually add standard XML tags to financial facts. Users of these tools must basically use extensive mapping routines as inputs to write XML metadata. The present invention addresses these concerns and others.

SUMMARY

In one aspect of the invention, a hosted web service automatically converts uploaded financial and related business information documents into a standardized format including XML-based schema documents such as XBRL, which can then be submitted to a multiple geographies, jurisdictions or financial reporting entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 3 is a block diagram showing an example host computing environment in which aspects of the invention may be implemented.

DETAILED DESCRIPTION

Exemplary Embodiments

Figure 1:
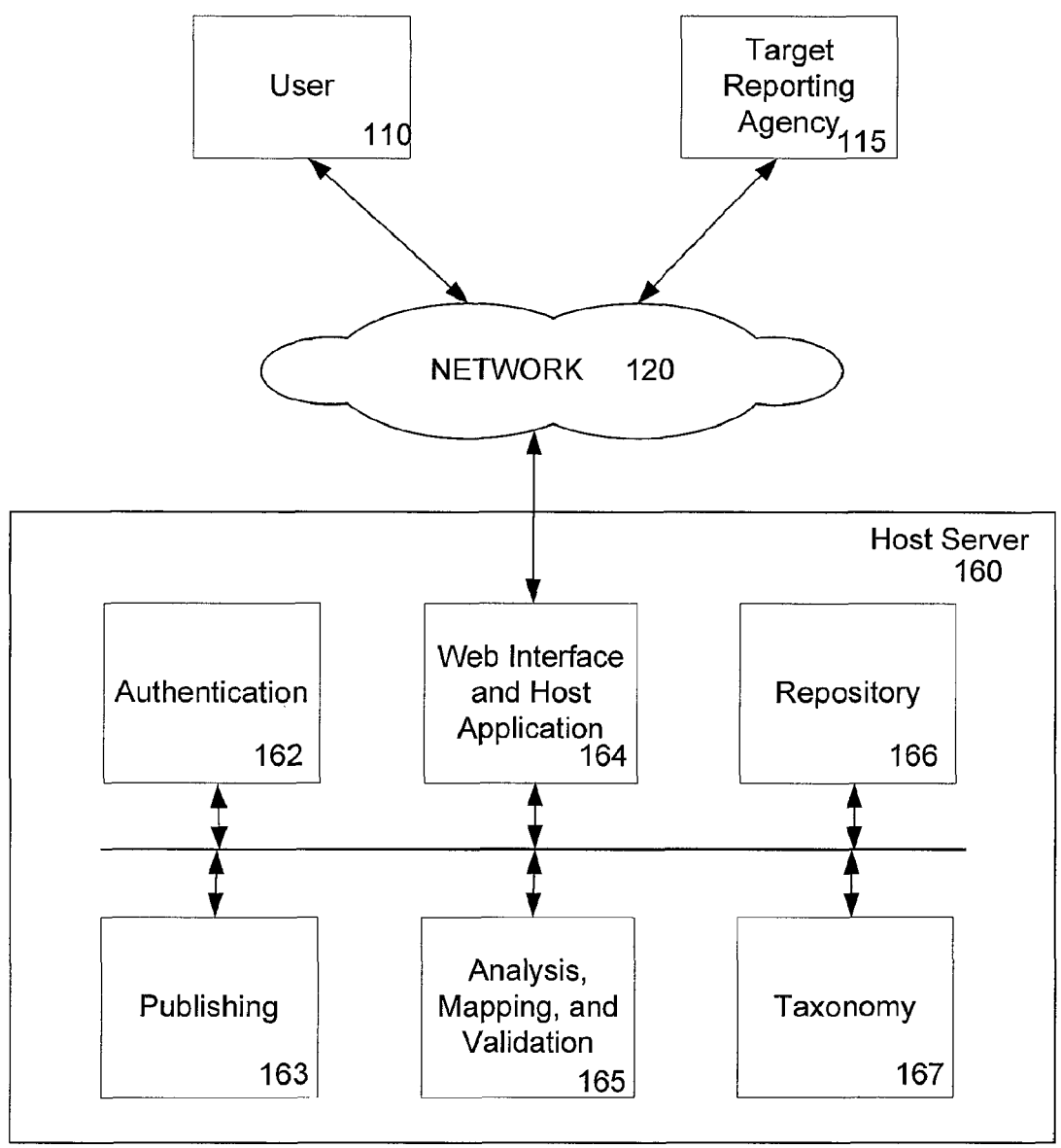
FIG. 1 is a block diagram showing an example architecture for a system supporting the generation of XML-based schema documents such as XBRL.

FIG. 1 depicts an example architecture of a web-based financial document conversion system having aspects of the current invention. The network 120 may be any network, such as a LAN or WAN, but preferably the network 120 represents the Internet as currently known to those of skill in the art. Nodes on the network include a user node 110, a host server node 160, and at least one target reporting agency node 115. Examples of a target reporting node is any financial-based institution that may have financial reporting requirements. Such reporting nodes generally include government agencies, banks, and stock exchanges. Examples include, but are not limited to US regulatory agencies such as the Securities and Exchange Commission (SEC), and the Federal Deposit Insurance Corporation/Federal Financial Institutions Examination Council (FDIC/FFIEC). Foreign regulatory agencies may include the Spanish Stock Exchange Commission (CNMV—Comisión Nacional del Mercado de Valores), the German Bundesbank, the UK tax authority, Her Majesty's Revenue and Customs, the Dutch Ministries, and the Committee for European Banking Supervisors which represents all European national banking regulators. Stock Exchanges reporting entities include KOSDAQ, and the Tokyo Stock Exchange. All of the above-mentioned reporting agencies have indicated some level of intention to incorporate electronic reporting of financial statements using Extensible Business Reporting Language (XBRL) as a standard reporting language.

In one aspect of the invention, the host application server 160 is a network-based server that provides financial document conversion of financial information in a native form to a financial reporting statement in a defined XML-based schema such as XBRL. The network 120 interfaces with the web interfaces and host application 164 of the host server 160. The host application provides the overall infrastructure and is the primary consumer of the data that will be stored and published by the server 160. The host application maintains its own processes, such as user management, and business rules required to make intelligent use of the data that will be provided by the user. The host application and web interfaces serve to interact and interface with the other functional blocks of the server which include authentication 162, repository, 166, publishing 163, analysis, validation and mapping 165, and standardized data definition and taxonomy 167 modules.

The web interface 164 interacts presents a web interface to the end user. As an example, in the context of a prototype loan application, the web user interface 164 will provide an interface to handle the submission of financial data, the interactive mapping of line items onto a pre-supplied taxonomy, and the extension of the pre-supplied taxonomy to meet the specific needs of the end user and the reporting documentation standards. A user management function is responsible for maintaining and including the association of users with companies and assigning roles/privileges to the user based on the rights assigned to those users.

The authentication module 162 provides a mechanism for authentication of the user before upload of any financial information. In general, users must be authenticated before the server 160 services can be used. Once a user has been authenticated, host application server 160 may choose to cache the authentication status to prevent unnecessary external authentication requests. The authentication module 162 may perform authentication itself or it may delegate authentication authority to an authentication mechanism such as a web-based authentication service. In one embodiment, the authentication module will thus be composed of bridges to various possible points of authentication such as the host application, the user's enterprise domain, or the local server 160 cache. The passing of session-specific tokens, or other artifacts, to identify the context under which a user interacts with the server will be managed by the authentication module 162 in co-operation with the host application 164.

The analysis and mapping module 165 performs the services of the validation of financial data, the conversion of financial data to commonly accepted formats, such as XBRL, and the aggregation of financial data to allow richer analysis and benchmarking spanning multiple instances of financial data. This module also includes financial models supporting the analysis and mapping functions. The mapping module 165 provides the functionality needed to interpret the submission of financial data onto pre-supplied taxonomy frameworks. In one embodiment, a requirement of the mapping module is the parsing of Excel™ spreadsheets, available through Microsoft® Corporation of Redmond, Wash. Excel™ spreadsheets are parsed into a usable object model from which financial information may be extracted. Another embodiment is the requirement for the parsing of text files, such as a tab-delimited text file. Such text files may include standard ASCII text files and word processing files such as Microsoft® Word™ text files.

The repository module 166 provides persistent storage for the server. In one embodiment, the repository is an instance of SQL Server™ also available from Microsoft® Corporation. The repository 166 is responsible for retention of the universal data model and most other working records.

The publishing module 163 is the primary means by which external users and processes consume the data provided by the host server 160. The server 160 delivers its financial data in a variety of ways which include HTTP/S for simple web-based access, SMTP if users wish to send/receive emails notifications of financial data, Web Services/SOAP for a programmatic way to access the financial data, and Microsoft Office SharePoint Services for online review and collaboration of financial data. In a preferred embodiment, XML electronic signatures are provided as an option for the secure transmission of financial data. For instance, a given user may choose to sign and encrypt a document such that only the intended recipient will be able to read the document and the intended recipient can trust that the document has not been altered during transit. In one embodiment, the encryption is performed using standard public/private key pairs under acceptable security protocols.

In one embodiment, the server 160 provides a taxonomy module 167 for gathering taxonomy requirements and updates from interested financial entities such as the user and the destination reporting agency. The set of taxonomies and their extensions maintained are integrated into the core set of taxonomies and as views over the universal data model. Generally, the user can add a useful taxonomy for better financial statement reporting and also provide additional audit trail aspects.

Figure 2:
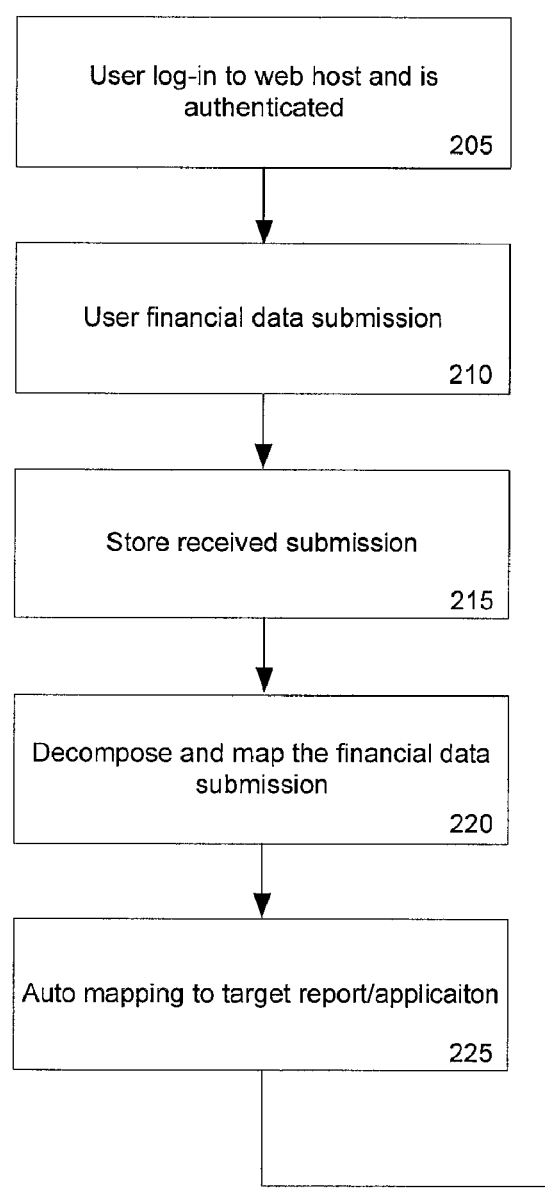
FIGS. 2 is an example flow diagram depicting a method of generating an XML-based schema document such as an XBRL financial reporting document.
Figure 2:
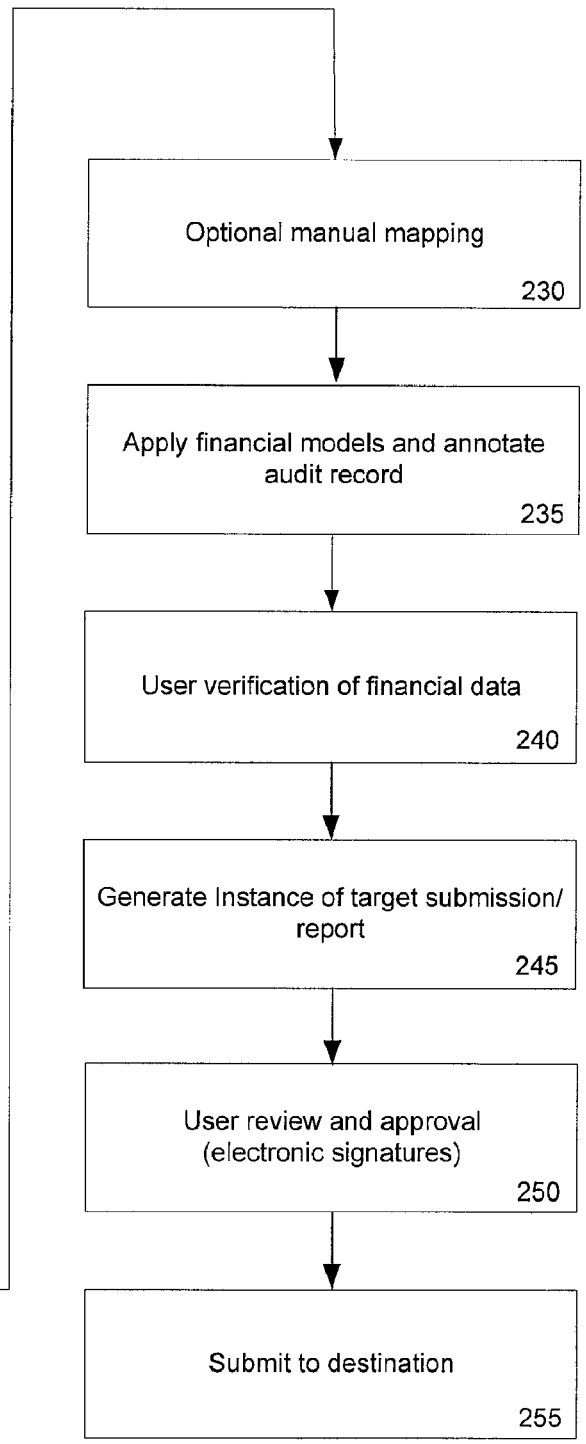

FIG. 2 is an example flow diagram involving aspects of the invention. The method 200 of FIG. 2 represents actions taken by entities of the system of FIG. 1 to log onto the system, submit a financial document, convert that document to a format required by the destination reporting agency, and then submit the final financial statement in the prescribed or required XML-based schema such as an XBRL format. Initially a user logs into the host server and is authenticated in step 205. The first action that a user must take before performing any actions is to authenticate themselves by supplying their user credentials. The server 160 accommodates a variety of ways to perform authentication. The authentication can be server 160 based or can be externally based by using an external authentication server, based on the web, which invokes security protocols that are appropriate for the user's business. Generally, the authentication protocol involves the use of tokens to verify the identity of the user to access and submit information to the financial host server 160.

After the user is authenticated to the system, the user generally selects which actions he would like to take. Assuming the user wishes to submit a financial statement to a reporting agency, the user would upload his financial data at step 210. Financial information generally exists in some form of a structured document, whether that be an Excel™ spreadsheet, an XBRL instance document, or as discrete figures entered into a WebForm. This information can be sent to the financial server 160 directly via e-mail, a user web interface, or a file uploaded from another secure location. In the case where the document comes from a Web form, the document data will exist in the form of name-value pairs. Otherwise, the format of the input document preferably is known to the server 160.

The uploaded document is stored in native format in step 215. In one embodiment, the uploaded user financial data is stored as a read-only copy for purposes of data extraction and audit record build. Also associated with the individual data are metadata that was either captured from the user during data submission or gathered from the source document itself. The persistent storage of the server 160 retains a complete audit trail of all financial data that has been submitted. In one feature of the invention, an audit log is generated that indicates all of the manipulations relevant to the formation of a final financial statement from the user's input of financial data. Thus, it becomes possible to trace back all of the final financial results, as well as the approvals, back to the original source document and the individuals who authorized the generation or change of the final financial statement. The audit information can include any stored financial data, any relevant financial model, any confirmations of data from the user, the source of any electronic signatures, and any electronic transmission of the signed final-form statement of financial data.

After the original uploaded document is stored, a copy is read and decomposed into its component parts at step 220. The server analyzes the data that was submitted decomposes the individual points of data into discrete facts. These facts can exist as very loosely coupled pieces of information, where the inherent structure that originally encapsulated the set of facts has been stripped away. This highly decoupled nature of the facts will allow them to now be mapped and applied to taxonomies and forms with wide flexibility. In one embodiment, the server 160 accepts and understands financial data that exists in an Excel™ worksheet. Other embodiments provide support for uploaded user financial data documents in XBRL format, and ASCII or other text-based formats, including Microsoft Word.

One function of the server is the mapping function which can handle an extremely diverse set of inputs, and impose a structure on a dataset where there was no explicit pre-existing structure. Automatic mapping of the decomposed data into a target report or other target financial application is performed in step 225. Decomposing the financial data into individual data values also results in a mapping state associated with the decomposition. In one embodiment, a mapping state is enumerated for each of the states of: unknown, tentative, mapped (automatically), mapped (historically), mapped (manually), and unmappable. To confirm that the mappings should be accepted in a specific state, there may be an interactive exchange with the user to finalize the mapping states. Once this call is made, all mapping states will be persisted in the object model and a historical snapshot of the mappings will be made. The historical snapshot can serve as hints for future mapping sessions.

Individual mappings define associations between facts, such as the data values, that came from the source document to concepts in a selected standardized data definition set or taxonomy. These mappings are created both automatically and manually by the user. It is possible that a single fact can be simultaneously mapped to multiple taxonomies. These mappings will be stored in the persistence layer, and will form part of the user and company profile. These profiles can also be examined during future mappings sessions to reduce the amount of manual mappings that need to be performed.

The process of mapping a document may include manual mapping if an unknown or tentative data value is encountered. Under such conditions, as in optional step 230, the server will interact with the user to resolve the unknown data value to map it as needed. In this case, the host application explicitly creates a binding between a single instance of financial data value and a concept in the financial data model. When the mapping process receives a final, explicit confirmation from the user, then the server 160 will make a permanent record of the document and the mappings that have been applied. These mappings will be stored in the persistence layer, and will form part of the user and company profile. These profiles can also be examined during future mappings sessions to reduce the amount of manual mappings that need to be performed.

After the input document, such as a spreadsheet, has been mapped, the financial data has been fully decomposed and exists in the database in a highly de-normalized state. Step 235 applies the financial model to the mapped values as those values are applied to a target reporting format. For example, if the target reporting format is an U.S. SEC reporting form, the decomposed values are driven into the SEC reporting format where the financial model is applied to produce results consistent with the desired format output and standard financial accounting procedures. Also, to preserve the integrity of the audit trail, the data model will always retains a pointer back to the original source document regardless of how many mutations the financial data may undergo. The server 160 uses internal financial models to provide the infrastructure for describing, analyzing and validating financial data. One of the capabilities provided by the server 160 financial models is the ability to validate a statement of financial data against the constraints imposed by a given financial model.

After a target reporting format is populated with the financial data acquired from the user's spreadsheet, the user is presented with the information. This rendering of the information to the user may be in a draft-form of the financial reporting statement format, such as an SEC filing, or the rendering may be in a standardized accounting format. In either instance, the user is given the opportunity to verify (validate) the accuracy of the draft-form financial reporting statement in step 240. At this time, the user may enter edits to the draft-form statement and such edits will be entered and re-presented to the user for verification. Note that any manipulations to the draft financial statement is recorded in the audit log for data integrity.

To generate the above-mentioned rendering of data for verification, the host application server 160 provides at least the following: the name of the financial statement, the set of financial data which belong in a statement, the order in which the financial data should be rendered, the labels associated with the financial data, the relative nesting level of the labels, the formatting hints associated with the financial data (bold, overline, underline, etc.). With this information, the rendering to the user can proceed.

After the user verifies the draft-form of the financial reporting statement, an instance of the target submission report is generated at step 245. The instance is essentially a final-form of the financial report statement and is presented to the user for final approval. At this step, the individual financial facts are mapped onto the standardized data model or onto XBRL taxonomies associated with the instance document. The server can then take advantage of XBRL's calculation, formula and definition link bases, or other pre-defined validation requirements such as ratios, or calculations included in generally accepted accounting principles to perform consistency checks in the data. The server 160 can also determine the completeness of the financial data, as well as determine if the mappings were applied correctly by the user. The instance document itself may need to be signed and encrypted. For instance, public/private key pair cryptography standards are used to transfer the final-form financial statement between the user and the server 160.

The server 160 then provides the finalized statement for financial reporting to the user for final approval at step 250. Here, XML electronic signatures are generated by the user. By electronically signing the final-form reporting financial statement, the user provides authorization to submit or publish the XBRL submission. The final-form financial reporting statement is then published at step 255. Publishing the final-form financial statement may occur in a variety of ways, such as in HTTP-accessible URLs, as attachments in email messages, or as the data payload in a Web Service interaction. In a preferred embodiment, the final-form statement is published as an XBRL format that is displayed to the destination node on the network. But other formats are also available including a custom XML form defined by a 3rd party, and as an Excel™ worksheet. The server 160 repository will maintain a complete record of all requests made for financial data, enabling users to review over time to whom the financial data has been disclosed, and for what purposes as part of updates to the audit log. The audit log is viewable on a display monitor as a read-only document by any of the user, the server, and the destination node. The final-form financial reporting instance can be provided to applicable jurisdictions and geographies. Each jurisdiction of geography may have its own reporting standards and thus a different instance document may be generated for each such jurisdiction or geography based on the taxonomies available.

In another aspect of the invention, the flow diagram of FIG. 2 may be modified to target a XBRL document that is not a financial reporting statement. For example, the current invention is useable as an XBRL document production mechanism for the production of other type of financial documents such as applications for loans, mortgages, asset-based insurance, or letters of credit.

As an aspect of the invention, a computer-readable medium, such as, but not limited to, magnetic storage devices, optical devices, such as CD and DVD media may be used to store computer program instructions which can implement methods discussed or suggested herein. Such computer media are envisioned to retain executable instructions for use on a general purpose computer to enable it to practice aspects of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

FIG. 3 and the following discussion are intended to provide a brief general description of a host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 3, an exemplary system for implementing an example host computer includes a general purpose computing device in the form of a computer system 310. Components of computer system 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures.

Computer system 310 typically includes a variety of computer readable media. Computer readable media can be any available media that can be accessed by computer system 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer system 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 333, application programs 335, other program modules 336, and program data 337.

The computer system 310 may also include other removable/non-removable, volatile/nonvolatile computer storage media. By way of example only, FIG. 3 illustrates a hard disk drive 331 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3 provide storage of computer readable instructions, data structures, program modules and other data for the computer system 310. In FIG. 3, for example, hard disk drive 341 is illustrated as storing operating system 344, application programs 345, other program modules 346, and program data 347. Note that these components can either be the same as or different from operating system 344, application programs 345, other program modules 346, and program data 347. Operating system 344, application programs 345, other program modules 346, and program data 347 are given different numbers here to illustrate that, at a minimum, they are different copies.

A user may enter commands and information into the computer system 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390, which may in turn communicate with video memory (not shown). In addition to monitor 391, computer systems may also include other peripheral output devices such as speakers 397 and printer 396, which may be connected through an output peripheral interface 395.

The computer system 310 may operate in a networked or distributed environment using logical connections to one or more remote computers, such as a remote computer 380. The remote computer 380 may be a personal computer, a server, a router, a network PC, a peer device or other common network node, and typically includes many or all of the elements described above relative to the computer system 310, although only a memory storage device 381 has been illustrated in FIG. 3. The logical connections depicted in FIG. 3 include a local area network (LAN) 371 and a wide area network (WAN) 373, but may also include other networks/buses. Such networking environments are commonplace in homes, offices, enterprise-wide computer networks, intranets and the Internet.

When used in a LAN networking environment, the computer system 310 is connected to the LAN 371 through a network interface or adapter 370. When used in a WAN networking environment, the computer system 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer system 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from MICROSOFT Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for producing a conversion of input financial data to an XBRL format reporting statement, or other XML-based schema document. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to prepare an Extensible Business Reporting Language (XBRL) document in a host computer using information supplied by a remote user, the method comprising:
   receiving a remote user log-in at the host computer;
   receiving at the host computer a user-provided upload of financial data from a financial data document having an original financial data structure;
   storing the financial data;
   processing the financial data, wherein processing comprises decomposing the financial data by decoupling the financial data from an original financial data structure into discrete data values independent of the data values inherent in the original financial data structure;
   generating a mapping state associated with the decomposition comprising the discrete data values and an associated state for each discrete data value;
   mapping the decomposed financial data to a target financial document according to an associated financial model and according to the mapping state, the mapping producing a data-filled target financial document;
   applying the associated financial model to the data-filled target financial document and producing a draft-form statement of the financial data;
   sending the draft-form statement to the remote user for confirmation;
   receiving confirmation from the remote user;
   generating a final-form statement of the financial data and sending the final-form statement to the remote user for electronic signature;
   receiving the electronic signature from the remote user as authorization to submit the final-form statement; and
   transmitting the signed final-form statement to a destination in XBRL format;
   wherein all transactions performed to produce the signed final-form statement are recorded to form an electronic audit record.

2. The method of claim 1, wherein receiving a remote user log-in further comprises authenticating the user.

3. The method of claim 1, wherein receiving a user-provided upload of financial data from a financial data document comprises receiving at least one of the group comprising a spreadsheet, an ASCII text file, an XBRL formatted file, and a word processor text file.

4. The method of claim 1, wherein storing the financial data comprises creation of an audit record.

5. The method of claim 1, wherein automatically mapping the decomposed financial data further comprises validating the mapping of selected financial data into the target financial document.

6. The method of claim 1, wherein applying the associated financial model to the data-filled target financial document and producing a draft-form statement of the financial data further comprises validating the final-form statement of the financial data using constraints of the financial model.

7. The method of claim 1, wherein receiving confirmation from the remote user further comprises receiving edits to the draft-form statement of the financial data along with confirmation and an authentication from the user.

8. The method of claim 1, further comprising using public/private key pair encryption to provide data security while performing the steps of generating a final-form statement of the financial data and sending the final-form statement to the user for electronic signature and receiving the electronic signature from the user as authorization to submit the final-form statement.

9. The method of claim 1, wherein transmitting the signed final-form statement includes using public/private key pair encryption to encrypt the signed final-form statement.

10. The method of claim 1, wherein the audit record comprises the stored financial data, the financial model, the confirmation from the user, the electronic signature, and indication of electronic transmission of the signed final-form statement of financial data.

11. A server computer for generating Extensible Business Reporting Language (XBRL) reporting documents, the server computer comprising:
a communications interface programmed for accepting login attempts by a remote user from a remote network computer;
at least one storage area in the server computer programmed for storing program code and data;
a server computer processor programmed for executing the program code, wherein the program code directs the server computer to perform the functions comprising:
receiving the remote user log-in attempt;
uploading user-provided financial data from a financial data document having an original financial data structure;
storing the financial data in the at least one storage area;
decomposing the financial data by decoupling the financial data from an original financial data structure into discrete data values independent of the data values inherent in the original financial data structure;
generating a mapping state associated with the decomposition comprising the discrete data values and an associated state for each discrete data value;
mapping the decomposed financial data to a target financial document according to an associated financial model and according to the mapping state, the mapping producing a data-filled target financial document;
applying the associated financial model to the data-filled target financial document and producing a draft-form statement of the financial data;
sending the draft-form statement to the remote user via the communications interface for confirmation;
receiving confirmation from the remote user;
generating a final-form statement of the financial data and sending the final-form statement to the remote user for electronic signature;
receiving the electronic signature from the remote user as authorization to submit the final-form statement; and
transmitting the signed final-form statement to a destination node on the network in XBRL format;
wherein all transactions performed to produce the signed final-form statement are recorded to form an audit record, and wherein the signed final-form statement is displayed using a display device at the destination node.

12. The server computer of claim 11, wherein the processor further executes the program code to upload user-provided financial data from a financial data document by uploading at least one of the group comprising a spreadsheet, an ASCII text file, an XBRL formatted file, and a word processor text file.

13. The server computer of claim 11, wherein the processor further executes the program code to use public/private key pair encryption to provide data security while performing the steps of receiving, sending and transmitting.

14. The server computer of claim 11, wherein the processor further executes the program code to form an audit record comprising the stored financial data, the associated financial model, the confirmation from the user, the electronic signature, and transmission of the signed final-form statement of financial data.

15. The server computer of claim 11, wherein the processor further executes the program code to validate the mapping of selected financial data into the target financial document.

16. A computer-readable storage medium having computer-executable instructions for generating an Extensible Business Reporting Language (XBRL) reporting document when the instructions are executed by a processor, the computer-executable instructions comprising instructions that when executed cause the processor to perform the steps of:
receiving a remote user log-in and authenticating the remote user;
receiving a user-provided upload of financial data from a financial data document having an original financial data structure and storing the financial data;
decomposing the financial data by decoupling the financial data from an original financial data structure into discrete data values independent of the data values inherent in the original financial data structure;
generating a mapping state associated with the decomposition comprising the discrete data values and an associated state for each discrete data value;
mapping the decomposed financial data to a target financial document according to an associated financial model and according to the mapping state, the mapping producing a data-filled target financial document;
applying the associated financial model to the data-filled target financial document and producing a draft-form statement of the financial data;
sending the draft-form statement to the remote user for confirmation;
receiving confirmation from the remote user of the validity of the draft-form statement;
generating a final-form statement of the financial data and sending the final-form statement to the remote user for electronic signature;
receiving the electronic signature from the remote user as authorization to submit the final-form statement; and
transmitting the signed final-form statement to a destination in XBRL format;
wherein all transactions performed to produce the signed final-form statement are recorded to form an audit record.

17. The computer readable medium of claim 16, wherein the instruction for receiving a user-provided upload of financial data from a financial data document comprises receiving at least one of the group comprising a spreadsheet, and ASCII text file, an XBRL formatted file, and a word processor text file.

18. The computer readable medium of claim 16, further comprising an instruction for displaying the audit record.

19. The computer readable medium of claim 16, further comprising instructions for implementing public/private key pair encryption to provide data security when generating a final-form statement of the financial data and when sending the final-form statement to the user for electronic signature.

20. The computer readable medium of claim 16, wherein the audit record comprises the stored financial data, the financial model, the confirmation from the user, the electronic signature, and electronic transmission of the signed final-form statement of financial data.

* * * * *